June 5, 1923. 1,457,548
A. PETIT
MIXED DRIVING WINDLASS VEHICLE FOR TILLING PURPOSES
Filed June 23, 1919 4 Sheets-Sheet 1

Inventor
A. Petit,
By H. R. Kerslake
Atty.

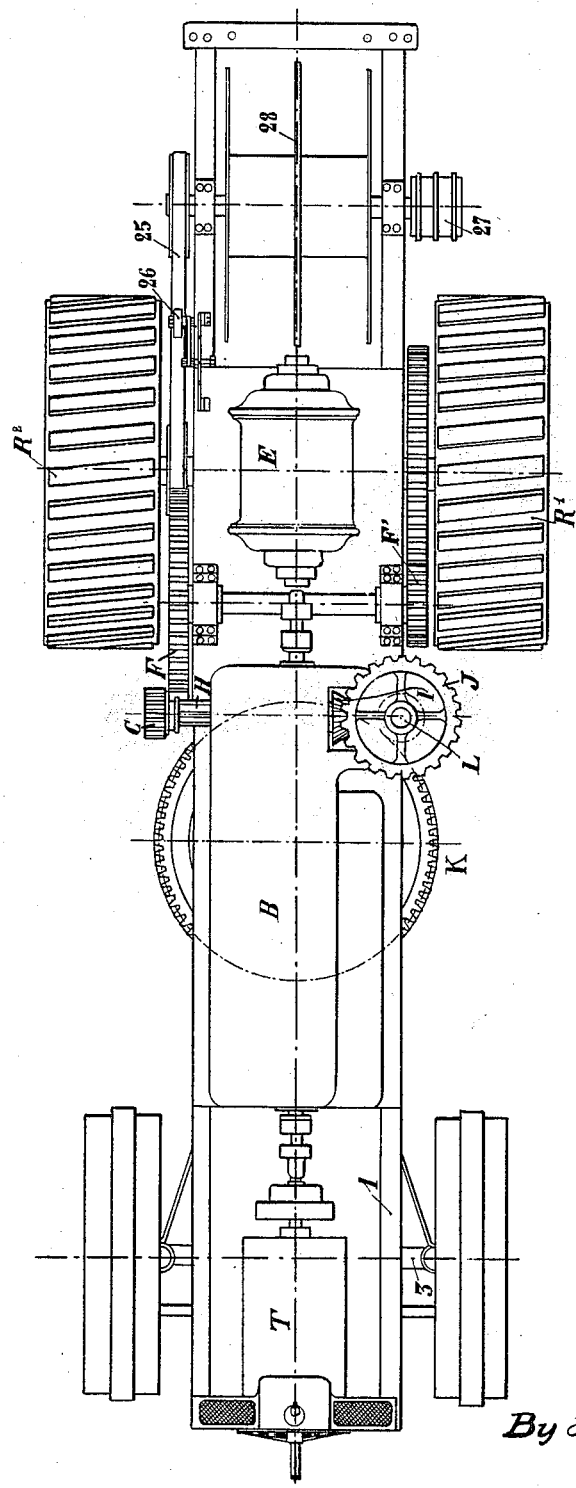

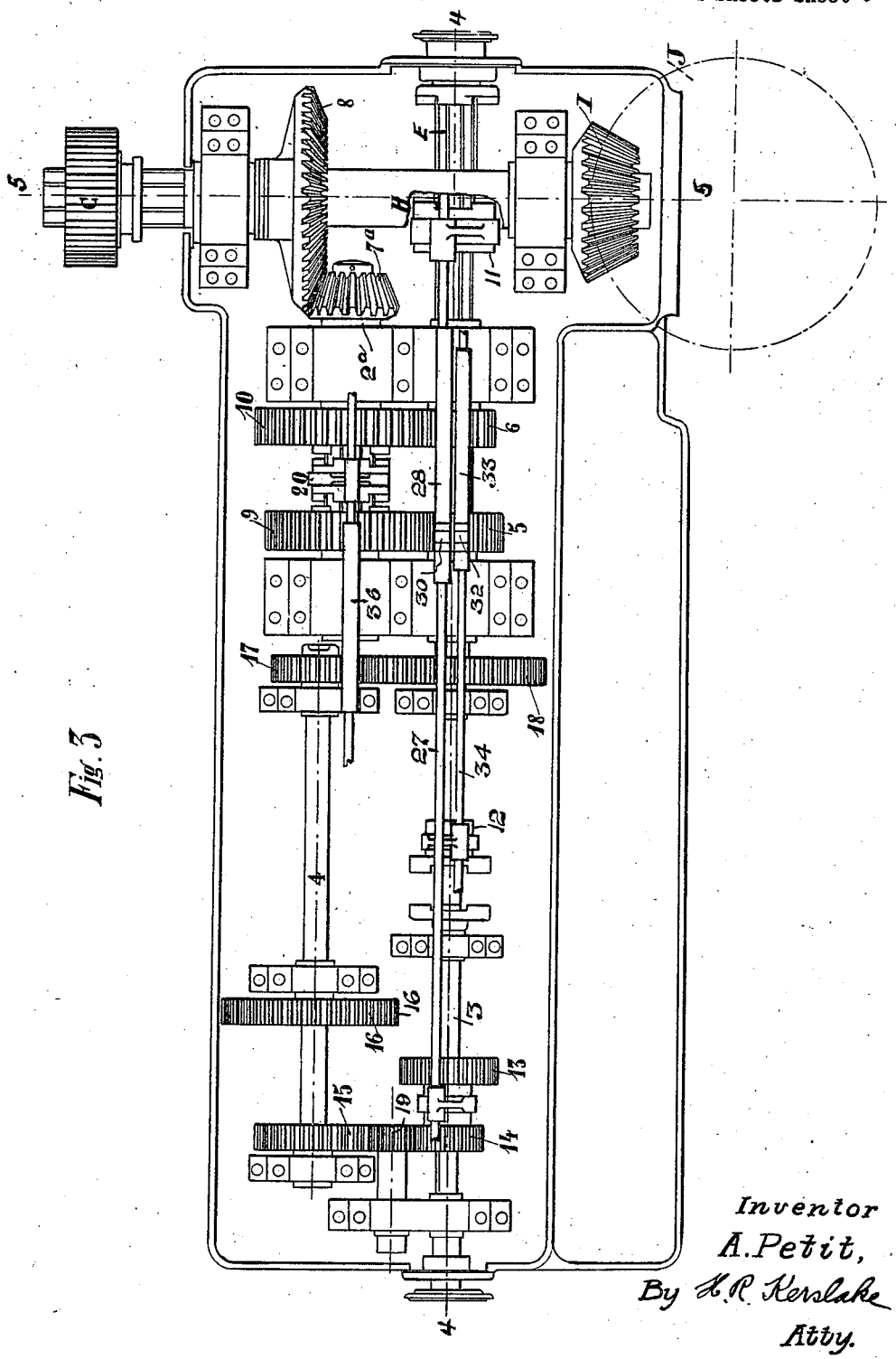

June 5, 1923.
A. PETIT
1,457,548
MIXED DRIVING WINDLASS VEHICLE FOR TILLING PURPOSES
Filed June 23, 1919
4 Sheets-Sheet 4
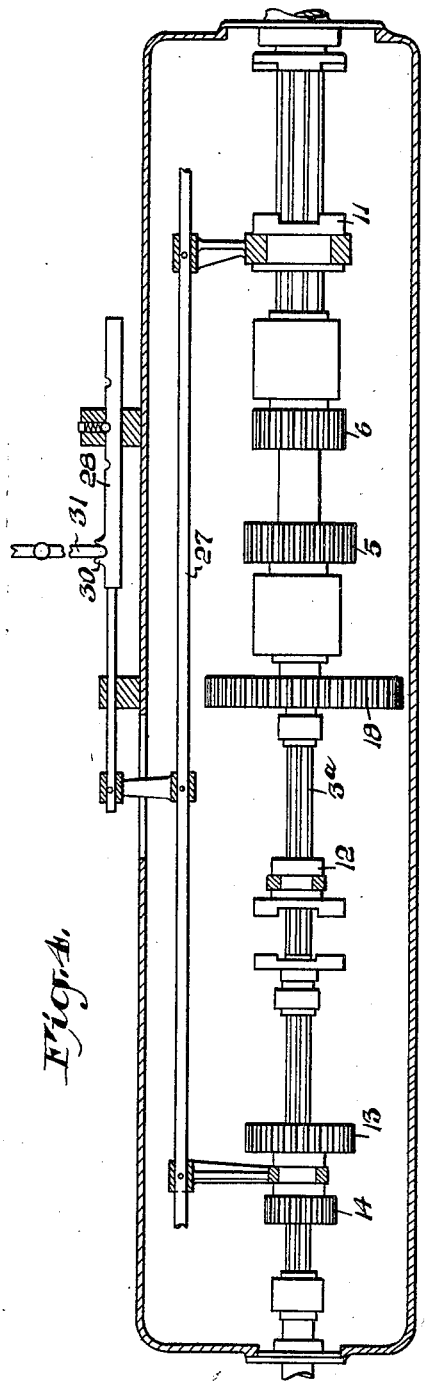
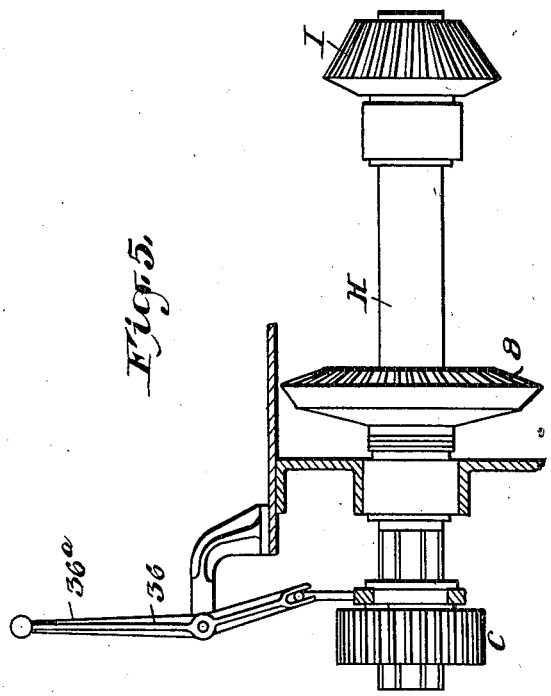
Inventor:
A. Petit
By H. R. Kerslake.
Attys.

Patented June 5, 1923.

1,457,548

UNITED STATES PATENT OFFICE.

AMÉDÉE PETIT, OF PARIS, FRANCE, ASSIGNOR TO SOCIETE GENERALE AGRICOLE, OF PARIS, FRANCE.

MIXED-DRIVING WINDLASS VEHICLE FOR TILLING PURPOSES.

Application filed June 23, 1919. Serial No. 306,270.

(GRANTED UNDER THE PROVISIONS OF THE ACT OF MARCH 3, 1921, 41 STAT. L., 1313.)

*To all whom it may concern:*

Be it known that I, AMÉDÉE PETIT, a citizen of the French Republic, residing at 44 Rue du Louvre, Paris, France, have invented certain new and useful Improvements in Mixed-Driving Windlass Vehicles for Tilling Purposes (for which I have filed application in France November 8, 1917), of which the following is a specification.

This invention has for its object to provide an improved mixed-driving tilling windlass vehicle that is to say, a windlass vehicle comprising an electric motor and a heat engine, both of which can be employed either concurrently, or separately one from the other, for propelling the vehicle carrying the windlass or for driving the drum of the windlass when the latter is used to draw agricultural implements.

A constructional form of the improved mixed-driving tilling windlass vehicle is illustrated by way of example in the accompanying drawings in which:

Fig. 2 is a plan of this windlass.

Fig. 3 is a horizontal section of the change-speed box.

Figure 4 is a longitudinal section taken on line 4—4 of Fig. 3.

Figure 5 is a transverse section on the line 5—5 of Figure 3.

Figure 1:
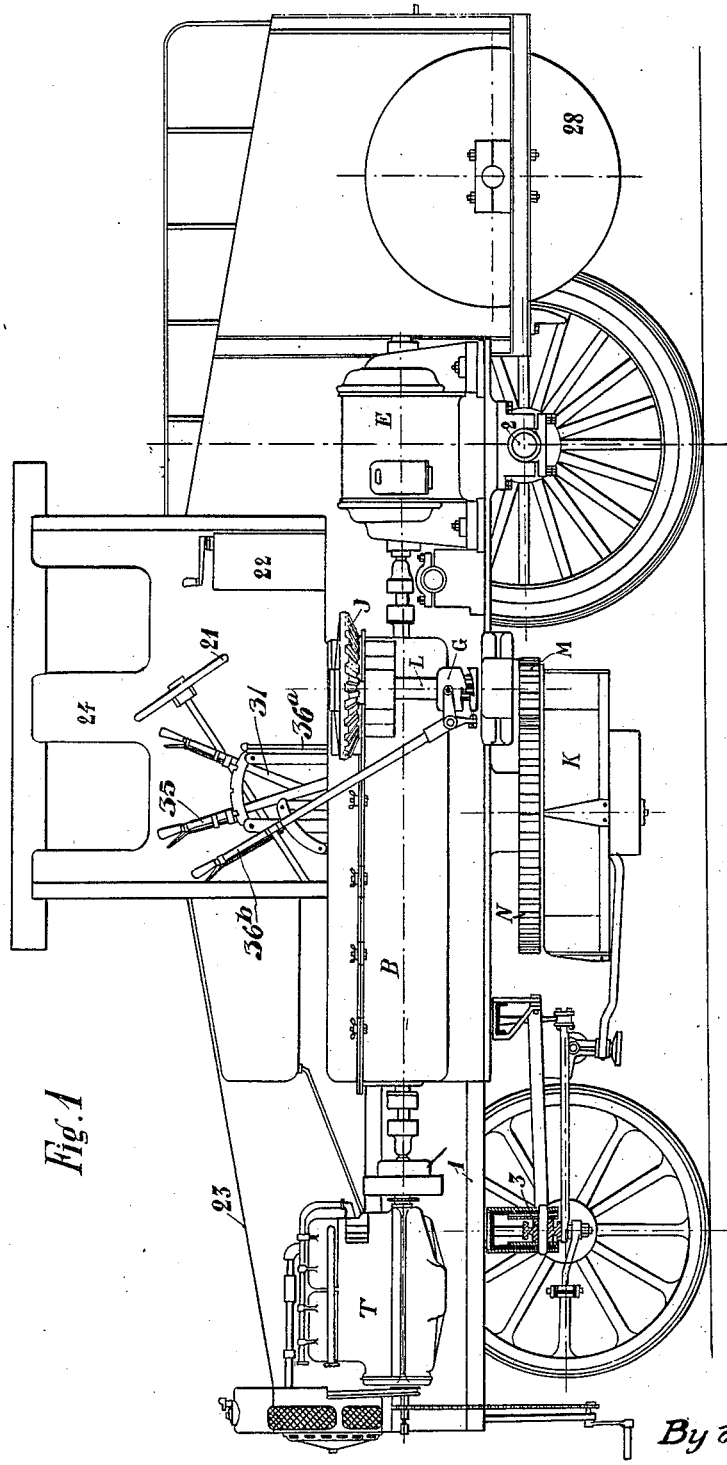
Fig. 1 is a side elevation of an improved windlass according to this invention.

The improved windlass comprises a frame 1 mounted on a hind axle 2 without a differential and on a front axle 3 capable of rocking on a horizontal pin that allows it to assume any inclination.

In the axis of the under-carriage at its front part there is mounted a heat engine T, and at its rear is mounted an electric motor E.

This engine and motor drive through a common change-speed box B a common transverse shaft H. This transverse shaft H drives at one side by means of a sliding pinion C, gearing F, F¹ for actuating the wheels R¹, R² and thereby effecting the propulsion of the vehicle.

On the opposite side to the pinion C the transverse shaft H drives through a pair of bevel wheels, I, J, a vertical shaft L which through a clutch G drives a pinion M engaging a toothed wheel N that is fixed to the drum K with vertical axis on which is wound the steel rope that draws the tilling implements.

This rope is wound with the help of a rope guide of the usual kind.

The change-speed box as best shown in Figs. 3 to 5, inclusive comprises essentially a first shaft 1ª driving through two toothed wheels 5, 6 a secondary shaft 2ª which drives through a pair of bevel wheels, 7ª, 8, the transverse shaft H. A symmetrical clutch 20 slidable along the shaft 2ª, and sharing the rotational motion of the latter, is adapted to couple the shaft 2ª to one or the other of the toothed wheels 5, 6 so as to give two speeds to both the forward travel of the vehicle and the winding of the draw rope.

The shaft 1ª is connected by a clutch 11 to the shaft E¹ of the electric motor E, and by a clutch 12 to the heat engine T.

The reversal of the motion of the electric motor is produced by means of the controller 22 which is such as to give the electric motor two forward speeds and two rearwards speeds for the travel of the vehicle and for the winding of the draw-rope.

The heat engine T drives the shaft 3ª situated in the axial line of the shaft 1ª.

On shaft 3ª there is mounted a sliding train 13—14 which, by means of a reversely operating pinion 19, controls a wheel 15 fixed on the shaft 4 for rearward travel, or a toothed wheel 16 fixed on the shaft 4. This shaft 4 drives the shaft 1ª through the toothed wheels 17, 18. Gear 13 is adapted to mesh with gear 16 for one forward speed.

On the other hand the shaft 3ª may be connected directly to shaft 1ª by means of the clutch 12 for another forward speed.

Owing to this construction, the heat engine T may drive the shaft 1ª with one rearward speed and two forward speeds, and is able by means of the shaft 2ª to drive the windlass vehicle with two rearward speeds and two forward speeds for propelling the vehicle.

Control mechanism of the gear casing: The pinion 13—14 and the clutch 11 are actuated in opposite directions by a longitudinally movable rod 27 that is connected to bar 28, which has a fork 30 engaged by the end of the transmission lever 31. The bar 28 is provided with three notches which cooperate with a latch that holds the bar 28 stationary at the dead point or in its end positions which correspond to the movements of pinion 13—14 and clutch 11.

The same transmission lever, which is pivotally mounted so as to oscillate transversely engages in the fork 32 mounted on another bar 33 which is parallel to the bar 28. Said bar 33 controls, by means of a rod 34, the fork which operates clutch 12.

By these means and by means of the single level 31, we thus actuate: first, clutch 12, which causes the clutch of the heat engine to the shaft 1ª; second, clutch 11 which causes clutching of the electric motor to the shaft 1ª; and third, pinion 13—14, which drives shaft 4 in opposite directions.

It will thus be seen that when the rod 27 is shifted to its extreme position at the right, the clutch 11 will cause the electric motor to drive the shaft 1ª. On the other hand when the rod 27 is shifted to an intermediate position, it will cause the gear 13 to mesh with gear 16 and at the same time will throw out the clutch 11. When the rod 27 is shifted to the extreme left position, the gear 14 will cause the pinion 19 to reverse the movement of shaft 4. Therefore, when the rod 27 is shifted to the extreme right position to throw in the clutch 11, the clutch 12 may be simultaneously thrown in by shifting rod 34 and this will cause the shaft 1ª to be driven by both the electric motor and by the heat engine.

The second lever 35 actuates, through bar 36, the clutch 20, permitting engagement of pinions 9 or 10 with the shaft 2ª.

The third lever 36ª acts on the lateral pinion C (Figure 6) to engage it with or disengage it from the transfer pinion F.

The fourth lever 36ᵇ serves to operate the clutch G. A pedal is provided for coupling up the heat engine. 21 is the steering hand wheel.

The entire mechanism is protected by a sheet metal cover 23 having a cabin 24 for the driver.

The electric motor E is connected to an outside electricity supply by an insulated cable that is wound on a reel 28 having a horizontal axle arranged at the rear of a vehicle. This reel is fitted with an automatic drive consisting of a slack belt 25 adapted to be brought into operation by a hand tensioning device 26 which allows of regulating the speed of winding. The reel 28 is hollow so as to allow the cable to pass through for connection to a collector 27 from which the current is taken by a set of brushes and conveyed to the motor.

The foregoing constructions are given solely by way of example; the forms, dimensions, constructional details and applications may be varied without departing thereby from the nature of the invention.

Having now particularly described and ascertained the nature of my said invention and in what manner the same is to be performed I declare that what I claim is:—

1. The combination in a mixed driven tilling windlass vehicle having propelling wheels and a winding drum, of a heat engine and an electric motor mounted on said vehicle, a transmission mechanism arranged between said motor and engine and adapted to be connected independently to said motor or engine, and means connecting said mechanism to the motion-transmitting parts for propelling the vehicle in forward and rearward directions at different speeds, or for rotating said drum.

2. A combination as claimed in claim 1 in which the transmission mechanism comprises two trains of toothed wheels of different diameters, one of which is driven from the heat engine and comprises a reversing gear, whilst the other train is driven from the electric motor, said two trains of toothed wheels being capable of transmitting their motions at variable speeds respectively to the propelling road wheels of the vehicle and the drum for winding the cable that draws the tilling implements.

3. In a mixed driven tilling windlass vehicle as claimed in claim 1, mechanism for use in connecting the electric motor to an outside supply of electricity, said mechanism provided with a reel current-collector, a slack belt for driving said reel, and a hand tensioning device for regulating the speed of said reel to suit the travel of the vehicle.

4. In a motor operated vehicle, a transmission mechanism having a primary shaft, an electric motor arranged on one side of said mechanism, a heat motor arranged on the other side of said mechanism, and means included in said mechanism for connecting either the electric motor or the heat motor, or the two combined, with a primary shaft of said mechanism.

5. A motor vehicle including a transmission mechanism having a primary shaft, an electric motor arranged at one side of said mechanism, a heat motor arranged at the other side of said mechanism, coupled elements provided with movable handles and mounted on the primary shaft of said mechanism for connecting said shaft either to the electric motor or to the heat motor or to the two combined, a traction cable drum operated from said mechanism, and means included in said mechanism to effect forward and backward movement of said vehicle at different speeds, or the rotation of the traction cable drum.

6. The combination with a vehicle having propelling wheels and a winding drum, a heat engine and an electric motor mounted on said drum, a shaft for driving the propelling wheels or said drum, and power transmitting mechanism arranged to drive said shaft and including change speed mechanism driven by either the heat engine or the electric motor.

Dated this 4th day of November, 1918.

AMÉDÉE PETIT.